United States Patent [19]
Drebin et al.

[11] Patent Number: 5,438,654
[45] Date of Patent: Aug. 1, 1995

[54] SYSTEM AND METHOD FOR SHARPENING TEXTURE IMAGERY IN COMPUTER GENERATED INTERACTIVE GRAPHICS

[75] Inventors: Robert A. Drebin, Mountain View; Gregory C. Buchner, Sunnyvale, both of Calif.

[73] Assignee: Silicon Graphics, Inc., Mountain View, Calif.

[21] Appl. No.: 88,352

[22] Filed: Jul. 9, 1993

[51] Int. Cl.[6] .............................................. G06T 5/00
[52] U.S. Cl. .................... 395/139; 395/128; 395/133
[58] Field of Search ............... 395/118, 1, 125, 128, 395/129, 133, 139

[56] References Cited

U.S. PATENT DOCUMENTS 4,974,176  11/1990  Buchner et al. ................. 395/128
5,148,497   9/1992  Pentland et al. ................. 395/128

OTHER PUBLICATIONS

Stephen A. Zimmerman, "Applying Frequency Domain Constructs To A Broad Spectrum of Visual Simulation Problems", 1987 Image Conference IV Proceedings, Jun. 1987.

Kenneth R. Castleman, *Digital Image Processing*, Chapter 8, "Geometric Operations", pp. 110–115, Prentice-Hall (1979).

William Dungan, Jr. et al., "Texture Tile Considerations for Raster Graphics", pp. 130–136, Siggraph 1978 Proceedings, vol. 12 #3, Aug. 1978.

*Primary Examiner*—Almis R. Jankus
*Attorney, Agent, or Firm*—Sterne, Kessler, Goldstein & Fox

[57] ABSTRACT

A system and method of interactively magnifying a first texture to generate a generally unblurred high resolution display image at a particular level of detail are disclosed. The method of the present invention includes the step of extrapolating from the first texture and a second texture to generate an extrapolated frequency band. The extrapolated frequency band approximates high frequency image information contained in a texture of higher resolution than the first texture. The method also includes scaling the extrapolated frequency band as a function of the particular level of detail to generate a scaled extrapolated frequency band, wherein the scaled extrapolated frequency band approximates high frequency image information contained in a magnified image of the first texture at the particular level of detail. The method of the present invention further includes augmenting the first texture using the scaled extrapolated frequency band to thereby generate a magnified image of the first texture at the particular level of detail.

20 Claims, 6 Drawing Sheets

SYSTEM AND METHOD FOR SHARPENING TEXTURE IMAGERY IN COMPUTER GENERATED INTERACTIVE GRAPHICS

BACKGROUND OF THE INVENTION

CROSS-REFERENCE TO OTHER APPLICATIONS

The following application of common assignee contains some common disclosure, and is believed to have an effective filing date identical with that of the present application:

U.S. patent application entitled "A System and Method For Adding Detail to Texture Imagery in Computer Generated Interactive Graphics", by Greg Buchner and Bob Drebin, Ser. No. 08/088,349, incorporated herein by reference in its entirety.

1. Field of the Invention

The present invention relates generally to texture imagery in computer generated interactive graphics, and more particularly to sharpening texture imagery in computer generated interactive graphics.

2. Related Art

A typical computer generated image comprises a plurality a polygons. Each polygon may contribute to one or more pixels of the final image (a pixel is a picture element of a display means), wherein each of the pixels may have a unique color based on such attributes as intrinsic color, lighting (specular highlights, shading, shadows, etc.), atmospheric effects (fog, haze, etc.), and texture. As is well known, textures are conventionally used to provide visual detail for polygon surfaces.

Conventional computer image generation systems store varying levels of detail (LOD) of texture data. LOD is described in many publicly available documents, such as "Texture Tile Considerations for Raster Graphics", William Dugan, Jr., et al., SIGGRAPH 1978 Proceedings, Vol. 12 #3, August 1978, which is herein incorporated by reference in its entirety.

FIG. 1 illustrates the LODs stored for a particular image. LOD[0], also called the base texture, is shown in FIG. 1 as being an 8×8 texture. The base texture LOD[0] is the highest resolution texture. LOD n represents the base texture LOD[0] magnified by a factor of $2^{-n}$ (other magnification factors could also be used). Thus, LOD[1] is a 4×4 texture, LOD[2] is a 2×2 texture, and LOD[3] is a 1×1 texture.

LODs of resolutions greater than the base texture LOD[0] are usually not stored due to memory limitations. For example, the memory requirement to store LOD[−1] (a 16×16 texture) is four times that to store LOD[0]. Similarly, a system which stores six LODs (that is, LOD[−1], LOD[−2], . . . , LOD[−6]) of resolutions greater than LOD[0] would require over 8,000 times more memory than a system which stores only LOD[0] (and LODs lower in resolution than LOD[0]). Thus, storing LODs of greater resolution than the base texture LOD[0] is expensive and not practical.

A conventional texture technique is to map a two dimensional grid of texture data to an initially constant color polygon. This technique produces high quality results as long as an approximately 1:1 ratio of texture elements (texels) to display elements (pixels) is maintained. During successive magnification operations, LODs of greater and greater resolution are required to maintain the 1:1 ratio. Often, the required magnification is such that the 1:1 ratio cannot be maintained even when the base texture LOD[0] is used. In such cases (in conventional systems), data from the base texture are interpolated to perform the magnification. However, this results in a blurred image since the content of a single texture cell significantly affects more than one pixel of a display means (a cell is the smallest unit of characteristic definition that is accessible by the system).

More particularly, one problem that occurs when the required magnification is such that the 1:1 ratio of texel to pixel cannot be maintained even when the base texture LOD[O] is used is that the textured image lacks sharpness (i.e., blurry) as a result of over magnification.

A conventional approach for solving this problem in image processing systems involves sharpening an image by extrapolating from the image and a low-pass filtered (blurry) representation of the image. This technique is called unsharp-masking. The equation for a sharpened image S in accordance with unsharp-masking is defined as:

$$S(x,y) = (1+k)*F(x,y) - k*B(x,y)$$

where F is the original image, B is a blurred copy of F, and k is the sharpness factor. In conventional image processing systems, k is constant across the entire image. Consequently, conventional systems do not produce high resolution, clear results when the magnification of the image varies across the image. Conventional systems employing unsharp-masking are further flawed in that sharpening is not done simultaneously with magnification.

A second conventional approach for solving this problem involves using high order interpolation functions to preserve sharpness during magnification. However, this second conventional approach is flawed because the filter shape (used during interpolation) does not change on a per pixel basis depending on the degree of magnification.

Thus, what is required is a system and method that provides sufficient sharpness when an image is magnified beyond the resolution of the base texture LOD[0], without having to store textures of higher resolution than the base texture LOD[0].

SUMMARY OF THE INVENTION

The present invention is directed to a system and method of interactively magnifying a first texture to generate a generally unblurred high resolution display image at a particular level of detail. The present invention is adapted for use with an interactive computer graphics processing system, wherein the first texture and a second texture are stored in the interactive computer graphics processing system. The first texture is of higher resolution than the second texture. The system of the present invention includes extrapolating means for extrapolating from the first and second textures to generate an extrapolated frequency band. The extrapolated frequency band approximates high frequency image information contained in a texture of higher resolution than the first texture. A scaling means scales the extrapolated frequency band as a function of the particular level of detail to generate a scaled extrapolated frequency band, wherein the scaled extrapolated frequency band approximates high frequency image information contained in a magnified image of the first texture at the particular level of detail. The system of the present invention also includes image augmenting means for augmenting the first texture using the scaled extrapolated frequency band to thereby generate a magnified image of the first texture at the particular level of detail.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein.

DETAILED DESCRIPTION OF THE PREFERRED EMBODIMENTS

I. Overview of the Present Invention

The present invention is directed to a system and method for sharpening texture imagery in computer generated interactive graphics.

As will be appreciated, textures must often be magnified for close-up views. However, not all textures can be magnified without looking blurry or artificial. High frequency image information represents the fine details of a texture, such as the precise edges of letters on a sign or the silhouette of a tree. When the high frequency information is missing from a texture (due to a prior filtering operation, for example), the texture may become blurred if it is magnified.

In accordance with a preferred embodiment of the present invention, the two highest resolution, stored texture images (that is, the texture images at LOD[0] and LOD[1]) are used to extrapolate high-frequency information beyond the highest resolution, stored texture image (that is, the texture image at LOD[0]). As discussed above, the images at LOD[0] and LOD[1] are conventionally stored, whereas images at resolutions greater than LOD[0] (such as LOD[−1], LOD[−2], etc.) are not conventionally stored since such additional storage is expensive and not practical. Accordingly, the present invention allows a particular class of low resolution textured images to appear as sharp (after magnification) as if they had been processed with much higher resolution textures. This permits reduced texture image storage while maintaining high resolution image quality.

The present invention preferably operates with texture images having high frequency information, wherein the high frequency information primarily represents edge information. A stop sign is an example of this type of texture image (note that the edges of the letters in the stop sign have distinct outlines). Magnification normally causes the edges of the letters to blur. Operation of the present invention, however, maintains the integrity of the edges.

Also, the present invention preferably operates with texture images whose high frequency content is positionally correlated with its low frequency content. This condition implies that the frequency bands of all levels of detail are strongly correlated, where the frequency band for LOD[N] is the image component of texture LOD[N] missing from the lower resolution texture LOD[N+1] lost as a result of the filtering process used to generate image LOD[N+1]. This condition occurs, for example, in images which primarily describe edges.

Figure 1:
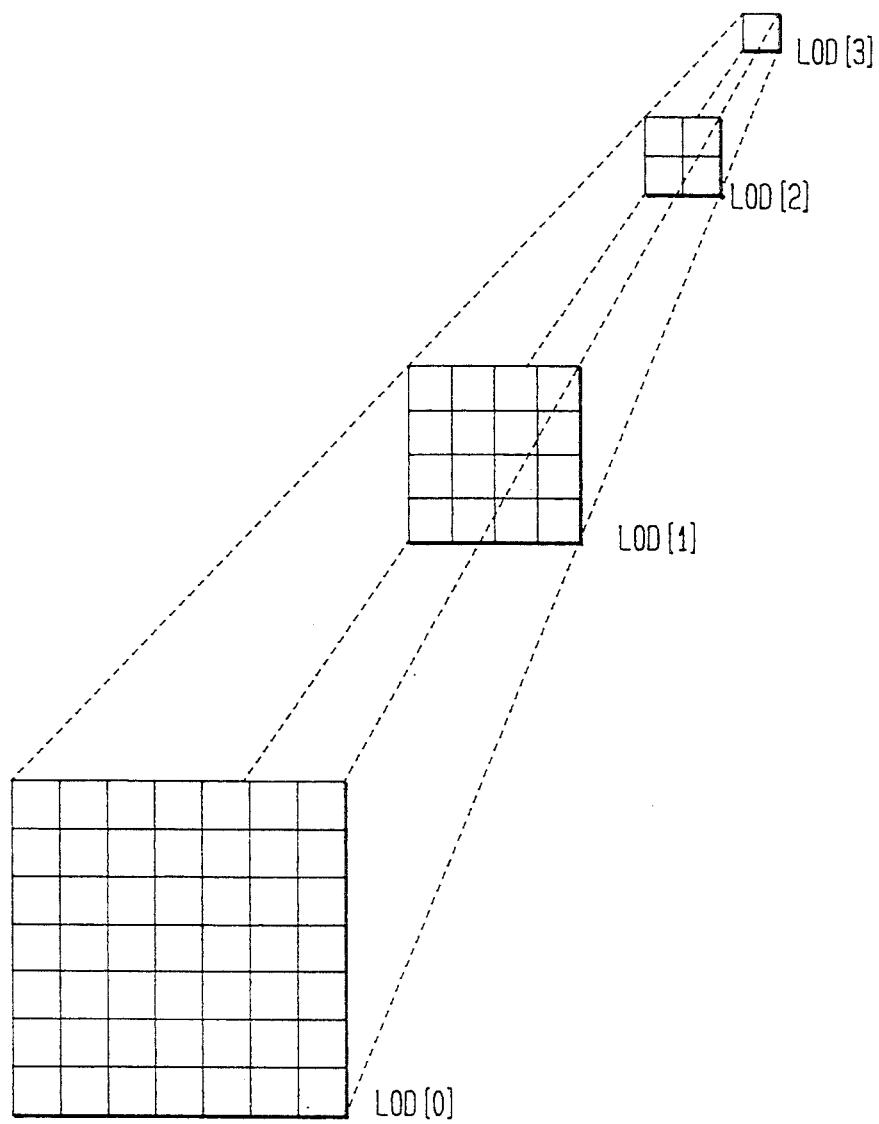
FIG. 1 illustrates the relationship between images having different levels of detail.

The present invention operates generally as follows. Varying levels of detail (LODs) of texture data for a given image are stored. Referring to FIG. 1, at least the base texture LOD[0] and the image at LOD[1] are stored. Preferably, LOD n represents the base texture LOD[0] magnified by a factor of $2^{-n}$, although other magnification factors could be used. Lower resolution textures may also be stored, such as LOD[2], LOD[3], etc.

During magnification, an extrapolation is performed with the base texture image (LOD[0]) and the image at LOD[1] to generate a magnified image which is close to the image that would have existed had the base texture image contained more samples. The difference between the base image, LOD[0], and the next highest resolution image, LOD[1], is the high frequency content removed from the base image LOD[0] during filtering. The extrapolation operation performed in accordance with the present invention is to add some percentage of this difference to the base texture LOD[0] to derive a texture image at LOD[N] with sharpness consistent with its LOD.

The operation of the present invention, as just described, is based on the following proposition: the image at LOD[N] can be reconstructed from the image at LOD[N+1] plus the difference between the images at LOD[N] and LOD[N+1]. This proposition was identified by the inventors and can be represented by Equation 1:

$$\text{image}(LOD[N]) = = \text{image}(LOD[N+1]) + (\text{image}(LOD[N]) - \text{image}(LOD[N+1])) \quad \text{Equation 1}$$

In accordance with the present invention, a frequency band is equal to the difference between the images at LOD[N] and LOD[N+1], as shown in Equation 2.

$$\text{frequency\_band}(LOD[N]) = \text{image}(LOD[N]) - \text{image}(LOD[N+1]) \quad \text{Equation 2}$$

Consequently, the general equation for image(LOD[N−1]) is:

$$\text{image}(LOD[N-1]) = \text{image}(LOD[N]) + \text{frequency\_band}(LOD[N-1]) \quad \text{Equation 3}$$

During magnification beyond the resolution of the base texture LOD[0], the frequency bands associated with the LODs finer than LOD[0] (such as LOD[−1], LOD[−2], etc.) are approximated by extrapolating between LOD[0] and LOD[1]. Such extrapolation is based on the assumption that the frequency bands of all levels of detail have the same characteristics (at the same relative positions in the images). This assumption is represented by Equation 4 (for any N):

$$\text{frequency\_band}(LOD[N-1]) = \text{frequency\_band}(LOD[N]) \quad \text{Equation 4}$$

Accordingly, the image at LOD[−1] can be obtained from the images at LOD[0] and LOD[1], as shown in Equation 5 (recall that LOD[0] and LOD[1] are stored).

$$\text{image}(LOD[-1]) = \text{image}(LOD[0]) + \text{frequency\_band}(LOD[0]) \qquad \text{Equation 5}$$

The frequency_band(LOD[0]) (from Equation 5) is as follows:

$$\text{frequency\_band}(LOD[0]) = \text{image}(LOD[0]) - \text{image}(LOD[1]) \qquad \text{Equation 6}$$

Since no new image characteristics are being introduced, the effect is that the image is being sharpened using only existing image characteristics. As noted above, the present invention preferably operates with images whose LOD frequency bands are highly correlated.

LODs of higher resolution than LOD[−1] are obtained in accordance with Equation 7.

$$\text{image}(LOD[-N]) = \text{image}(LOD[0]) + f(LOD[-N]) * \text{frequency\_band}(lod[0]) \qquad \text{Equation 7}$$

where LOD[−N] is the desired magnification level, and f(LOD[−N]) is a scale factor which is a function of LOD[−N]. The scale factor, f(LOD[−N], is allowed to have an integer and fraction components and is a programmable (per texture) function. Consequently, the sharpening operation can be precisely tuned based on how strong the correlation is between the high and low frequency information in the texture. If there is perfect correlation, f(LOD[−N]) should equal N. Other scaling functions are needed when the correlation is weaker. Preferably, a level of detail (LOD) factor (and thus a scale factor) is associated with each pixel being textured.

The relationship in Equation 7 follows directly from the relationship in Equation 5, and the assumption that all frequency bands for all LODs are generally similar (at the same relative positions in the images).

II. Detailed Operational Description of the Present Invention

The operation of the present invention, as generally described above, shall now be described in further detail.

Figure 2:
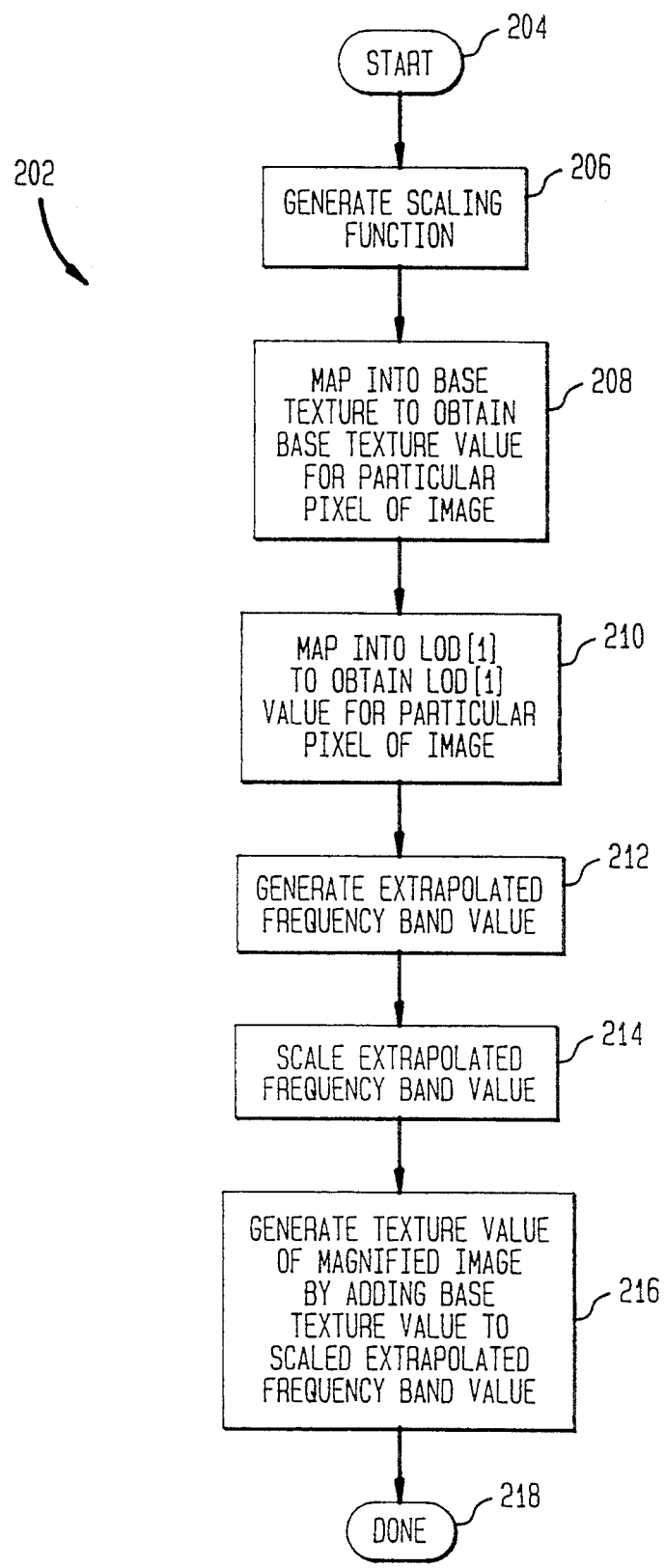
FIG. 2 is a flow chart representing the operation of a preferred embodiment of the present invention.
Figure 6:
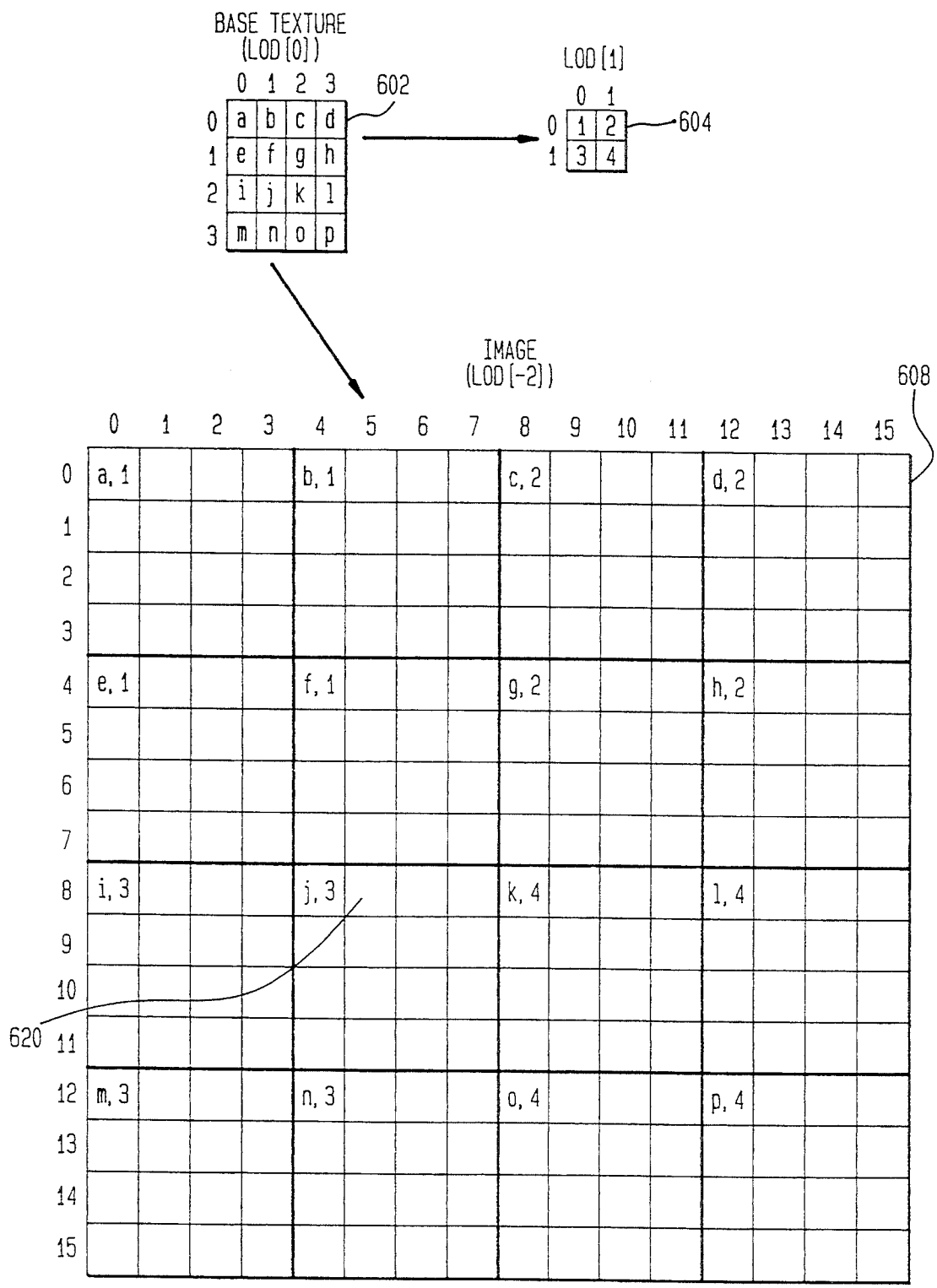
FIGS. 6, 7A, and 7B depict image maps for use in describing features of the present invention.

FIG. 2 is a flowchart 202 representing the operation of a preferred embodiment of the present invention. The flowchart 202 shall be described with reference to the image flow diagram presented in FIG. 6. FIG. 6 shows a base texture LOD[0] 602 (which is a 4×4 array), and an image 604 at LOD[1] (which is a 2×2 array). In the example shown in FIG. 6, a magnified image 608 at LOD[−2] is generated, wherein an extrapolation is performed using the base texture 602 and the LOD[1] image 604 to add sharpness to the LOD[−2] image 608.

The flowchart 202 begins at step 204, where control immediately passes to step 206. Step 206 represents an initialization step, and is performed prior to any attempts at magnifying the base texture 602.

In step 206, a scaling function is generated. As noted above, the present invention uses extrapolation to add high-frequency information (sharpness) to textured imagery. This extrapolation is done per-pixel based on the pixel's magnification factor, or level of detail (preferably, pixels of an image may have different levels of detail, so different scale factors may be associated with different pixels). Generally, as the magnification factor increases, more sharpness is needed. The scaling function controls the magnitude of extrapolation from the base texture which is performed.

The scaling function is dependent on the desired level of detail (LOD). Thus, the scaling function is represented by f(LOD[−N]), wherein −N is the desired level of magnification.

Since images vary in content, the scaling function is implementation dependent, and should be constructed based on the image content of the images being processed. Preferably, a different scaling function is associated with each image being processed, although alternatively a scaling function can be used with multiple images having similar image contents.

Preferably, the scaling function is generated such that little sharpness is added when the required magnification is close to LOD[0]. This is the case since the magnified image should be relatively similar to the image at LOD[0] when the magnification is close to LOD[0]. In fact, when N in Equation 7 is 0, the scale factor should be 0 (since the image at LOD[O] need not be sharpened to generate the,, image at LOD[0]). The scaling function should be generated such that more sharpness is added as the magnification level increases. Generally, the magnitude of the scaling function is globally decreased if the correlation is weak among all LOD frequency bands. Generally the increase in magnitude of the scaling function as a function of increasing LOD decreases if LOD[0]'s frequency band is strongly correlated to LOD[1]'s, but not to the frequency bands of the other LODs.

Figure 3:
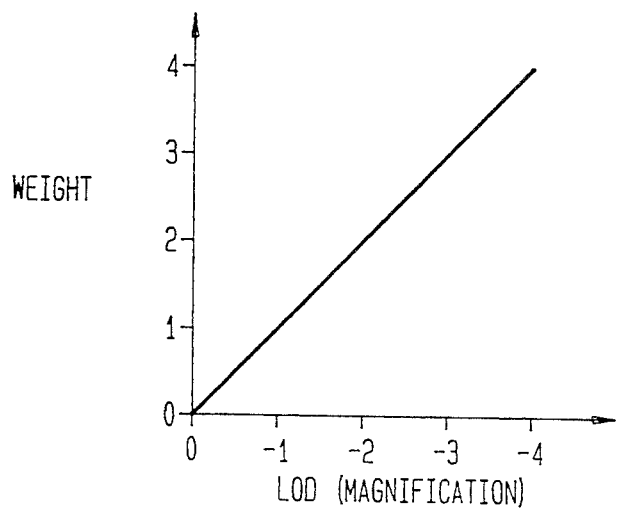
FIGS. 3, 4, and 5 illustrate sample scaling functions.

FIG. 3 illustrates an example scaling function, wherein the X-axis denotes the level of detail (magnification), and the Y-axis denotes the scale factor, or weight. The scaling function in FIG. 3 is linear, with a slope of 1.

Figure 4:
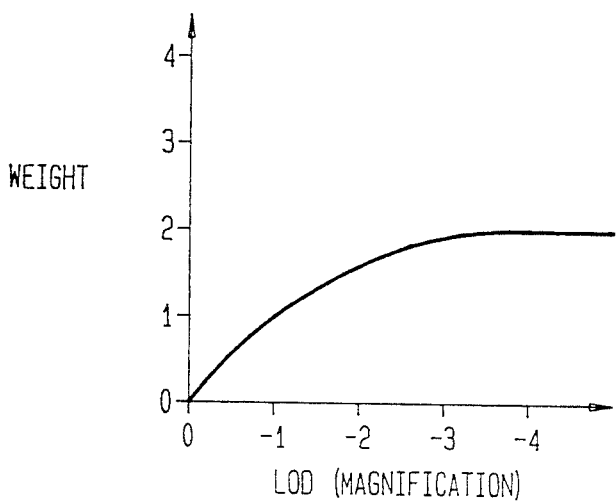

FIG. 4 illustrates another example scaling function, wherein the scaling function is non-linear and peaks at approximately a weight of 2. The use of a non-linear scaling function and setting the scaling function to a maximum weight limits the relative and maximal sharpness. This function would be used when the LOD frequency bands are less strongly correlated.

Figure 5:
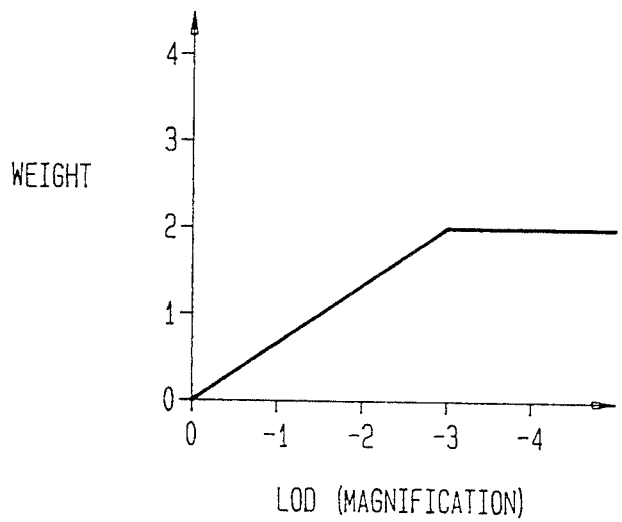

FIG. 5 illustrates another example scaling function, wherein the scaling function is initially linear and is then clamped to a particular weight. Clamping the scaling function to a maximum weight value is sometimes desired to limit the amount of ringing near edges in the texture caused by the sharpening operation.

Preferably, the scaling function is implemented using a look-up table of weights stored in memory (or alternatively implemented in hardware) indexed by LOD. Preferably the look-up table uses LOD indices with both integer and fractional components. The scope of the present invention encompasses other implementations of the scaling function, such as a state machine implemented in hardware.

Referring again to FIG. 2, after the completion of step 206, the base texture 602 can be magnified (in response, for example, frown a request from a person operating the interactive computer graphics system). In accordance with the present invention, only the base texture LOD[0], the image at LOD[1] (and any lower resolution textures), and the scaling function are maintained by the system. The textures of higher resolution than LOD[0] are not stored.

The remaining steps in FIG. 2 (that is, steps 208-216) implement the operations in the relationship of Equation 7. Preferably, the remaining steps of FIG. 2 are performed on a per pixel basis and, thus, Equation 7 can be represented as shown in Equation 8:

$$V(LOD[-N]) = V0 + f(LOD[-N]) * (V0 - V1) \quad \text{Equation 8}$$

where V(LOD[−N]) is a particular pixel in the magnified image 608, V0 is a base texture value (from the base texture 602) contributing to V(LOD[−N]), f(LOD[−N]) is a scale value from the scaling function associated with V(LOD[−N]), and V1 is a LOD[1] value (from the LOD[1] image 604) contributing to V(LOD[−N]). In accordance with Equation 8, the remaining steps of flowchart 202 shall now be described with respect to a particular pixel in the image 608. It should be understood that the remaining steps of FIG. 2 are performed for each pixel in the image 608.

In step 208, a base texture value (V0) for a particular pixel of the image 608 is obtained by mapping into the base texture 602. The detailed operation of step 208 shall now be described.

Referring to the example in FIG. 6, the base texture 602 is a 4×4 array and the LOD[−2] image 608 is a 16×16 array. As indicated by the darkened lines, the LOD[−2]image 608 is logically divided into sixteen 4×4 sections, wherein each of the sections maps to one of the sixteen texels of the base texture 602. Preferably, relative positional mapping is used to map between the LOD[−2] image and base texture 602, such that the section of the LOD[−2] image from (0,0) to (3,3) maps to the texel of the base texture 602 at (0,0) (the first coordinate designates the row, and the second coordinate designates the column). Similarly, the section of the LOD[−2] image from (12,12) to (15,15) maps to the texel of the base texture 602 at (3,3).

For illustrative purposes, assume the pixel 620 in the LOD[−2] image 608 at (8,5) is being processed. The pixel 620 maps to the texel in the base texture 602 at (2,1), which has a value of j. In a first preferred embodiment, the base texture value V0 for the pixel (8,5) is set equal to the value of texel in the base texture 602 at (2,1), or j. In accordance with this embodiment, however, the V0s for all of the pixels in the section containing the pixel (8,5) (that is, the section from (8,4) to (11,7) in the LOD[−2] image 608) are set equal to j. Similarly all the V1's in this section are set equal to 3. The result is a "blocky" magnification with little benefit from extrapolation.

Figure 7B:
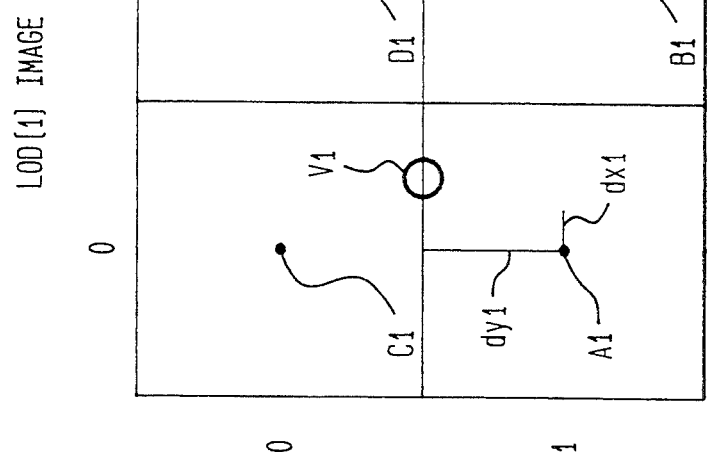
Figure 7A:
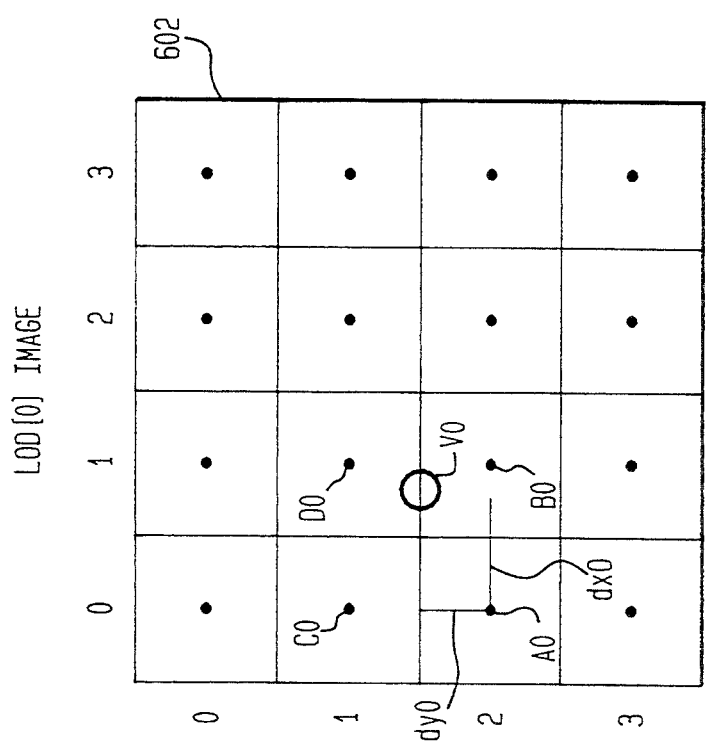

In accordance with a second preferred embodiment of the present invention, bilinear interpolation is performed to generate the value of V0 for the pixel 620. Consider FIGS. 7A and 7B, which illustrate the base texture 602 and the LOD[1] image 604 in greater detail. The pixel 620 maps to the base texture 602 as indicated by "V0" in FIG. 7A. In accordance with the present invention, the four texels in the base texture 602 closest to the pixel 620 are used in a bilinear interpolation to determine the value of V0. In the example of FIG. 7, the texels of the base texture 602 at (1,0), (1,1), (2,0), and (2,1) are the nearest neighbors of the pixel 620. The value of V0 is preferably calculated as shown in Equation 9:

$$V0 = A0*(1-dx0)(1-dy0) + B0*(dx0)(1-dy0) + C0*(1-dx0)(dy0) + D0*(dx0)(dy0) \quad \text{Equation 9}$$

where A0=i, B0=j, C0=e, and D0=f in the example of FIG. 6.

Bilinear interpolation is well known, and is described in a number of publicly available documents, such as *Digital Image Processing*, Kenneth R. Castleman, Prentice-Hall, Englewood Cliffs, N.J., 1979. Other interpolation schemes can alternatively be used to calculate V0, such as bicubic interpolation or other higher-order interpolation functions. Such interpolation schemes are well known, and are described in a number of publicly available documents, such as *Digital Image Processing*, Kenneth R. Castleman, cited above.

Referring again to FIG. 2, after generating the base texture value V0 for a particular pixel of the LOD[−2] image 608 in step 208, step 210 is performed. In step 210, a LOD[1] value (V1) from the LOD[1] image 604 is generated for the particular pixel of the LOD[−2] image 608 being processed. The detailed operation of step 210 shall now be described.

Referring again to the example in FIG. 6, the LOD[1] texture 604 is a 2×2 array. With respect to the LOD[1] texture 604, the LOD[−2] image 608 is logically divided into four 8×8 sections, wherein each of the sections of the LOD[−2] image 608 maps to one of the texels of the LOD[1] image 604. Preferably, relative positional mapping is used to map between the LOD[−2] image and LOD[1] texture 604, such that the section of the LOD[−2] image from (0,0) to (7,7) maps to the texel of the LOD[1] texture 604 at (0,0). Similarly, the section of the LOD[−2] image from (8,8) to (15,15) maps to the texel of the LOD[1] texture 604 at (1,1).

For illustrative purposes, assume again that the pixel 620 in the LOD[−2] image 608 at (8,5) is being processed. The pixel 620 maps to the texel in the LOD[1] texture 604 at (1,0), which has a value of 3. In a first preferred embodiment, the LOD[1] value V1 for the pixel (8,5) is set equal to the value of texel in the LOD[1] texture 604 at (1,0), or 3. For the reasons discussed above, however, a bilinear interpolation is performed in a second preferred embodiment to generate the value of V1 for the pixel 620. Such interpolation is necessary to minimize extrapolation artifacts. Consider again FIGS. 7A and 7B, wherein the mapping of the pixel 620 to the LOD texture 604 is indicated by "V1". Again, four texels in the LOD[1] texture 604 closest to the pixel 620 are used in a bilinear interpolation to determine the value of V1. The value of V1 is preferably calculated as shown in Equation 10:

$$V1 = A1*(1-dx1)(1-dy1) + B1*(dx1)(1-dy1) + C1*(1-dx1)(dy1) + D1*(dx1)(dy1) \quad \text{Equation 10}$$

wherein A1=3, B1=4, C1=1, and D1=2 in the example of FIG. 6. Again, other interpolation schemes (other than bilinear interpolation) can alternatively be used to calculate V1.

Referring again to FIG. 2, in step 212 an extrapolated frequency band value is generated as a function of V0 and V1. The extrapolated frequency band value is preferably set equal to: V0−V1. Accordingly, the extrapolated frequency band value contains the high frequency information between V0 and V1.

In step 214, a scaled extrapolated frequency band value is generated by scaling the extrapolated frequency band value using the scaling function (generated in step 206) based on the level of detail associated with the pixel of the image being processed (for example, the LOD[−2] image 608 in FIG. 6). As noted above, each pixel of the image being processed has a level of detail which is computed as a function of the width and height in texels of the region in the base texture which maps to the area of the pixel relative to the dimensions of the pixel. Preferably, the scale value for the pixel being processed is obtained from the scaling function by accessing a lookup table using the level of detail associated with the pixel being processed. The scale value is preferably multiplied by the extrapolated frequency band value (from step 212) to generate the scaled extrapolated frequency band value.

In step 216, the texel value for the pixel being processed is generated by preferably adding the base texture value V0 (from step 208) to the scaled extrapolated frequency band value (from step 214).

As noted above, the steps 208-216 are performed for each pixel in the magnified image being processed. Preferably, the steps 208-216 are interactively performed.

III. Implementation

Figure 8:
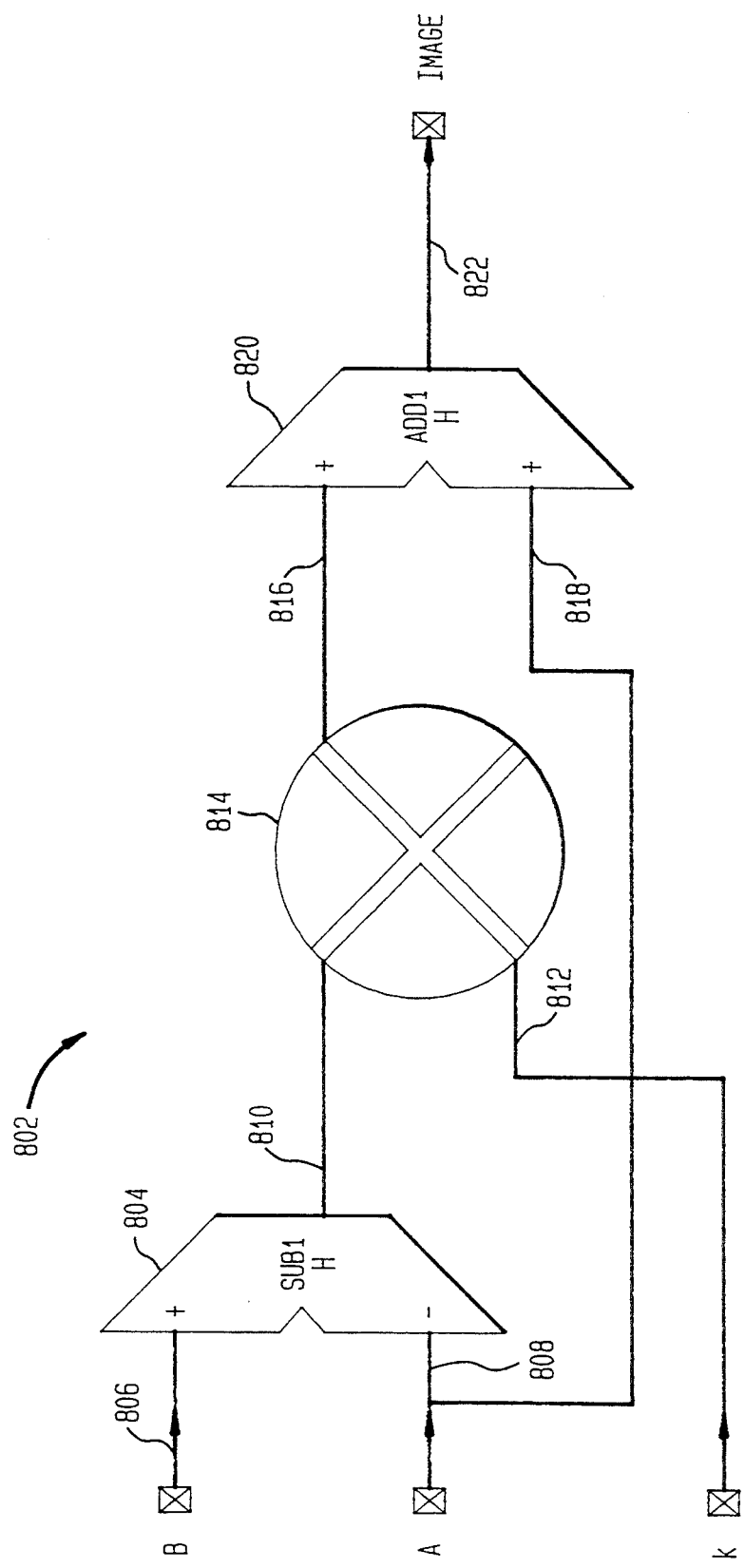
FIG. 8 is a block diagram of an apparatus for sharpening texture imagery in computer generated interactive graphics.

FIG. 8 is a block diagram of a preferred apparatus 802 operating in accordance with the present invention. As described below, the apparatus 802 can also implement conventional interpolation operations (also conventionally called minification). Thus, the present invention can be easily incorporated into existing interactive computer graphics systems, thereby further enhancing the utility of the present invention.

The apparatus 802 preferably includes a subtracter 804, an adder 820, and a multiplier 814. The apparatus 802 includes three inputs (labelled A, B, and K) and one output (labelled Image). Each of the inputs may represent a single wire (for serial operation) or multiple wires (for parallel operation).

The subtracter 804 subtracts signals present on the A input from signals present on the B input. The multiplier 814 multiplies signals representing the output 810 of the subtracter 804 with signals present on the K input. The adder 820 adds signals representing the output 816 of the multiplier 814 to the signals present on the A input to thereby generate the signals representing the magnified image (at the Image output 822). Thus, the operation of the apparatus 802 may be represented by Equation 11:

$$\text{Image} = A + k * (B - A) \quad \text{Equation 11}$$

While operating in accordance with the present invention, the input A receives signals corresponding to the base texture LOD[0]. The input B receives signals corresponding the image at LOD[1]. The input K receives signals corresponding to scale factors from the scaling functions. It is assumed that the scaling function has been previously generated as described above. It is also assumed that the signals corresponding to the correct scale factors from the scaling function are being presented on input K (selection of the correct scale factors from the scaling functions is described above).

Thus, when operating in accordance with the present invention, the apparatus 802 implements the operations inherent in Equation 12:

$$\text{Image} = \text{image}(LOD[0]) + k * (\text{image}(LOD[1]) - \text{image}(LOD[0])) \quad \text{Equation 12}$$

Equation 12 is the same as Equation 7, except the extrapolated frequency band in Equation 7 is image(LOD[0])−image(LOD[1]), whereas the extrapolated frequency band in Equation 12 is image(LOD[1])−image(LOD[0]). However, Equations 7 and 12 are exactly the same, since in Equation 7 the scaling function generates positively scale values (as shown in FIGS. 3-5). However, in accordance with the embodiment of the invention shown in FIG. 8, the scaling function generates negative scale values (the magnitudes in both cases are the same), thereby causing the transposition of image(LOD[1]) and image(LOD[0]) in the extrapolated frequency band of Equation 12.

As will be apparent to those skilled in the relevant art, the equation for conventional interpolation is as shown in Equation 13:

$$\text{Image} = \text{image}(LOD[N]) + (\text{image}(LOD[N+1]) - \text{image}(LOD[N])) * k \quad \text{Equation 13}$$

The apparatus 802 of the present invention can also be used to implement conventional interpolation by having input A receive signals corresponding to LOD[N], having input B receive signals corresponding to LOD[N+1], and having input K receive signals corresponding to the fractional portion of the desired level of detail (for example, 0.4 for LOD=2.4). Thus, the present invention can be easily incorporated into existing interactive computer graphics systems.

The apparatus 802 is preferably implemented in hardware using conventional arithmetic and/or logic components, such as adders, inverters, multipliers, shifters, multiplexers, and/or arithmetic logic units (ALU). Alternatively, the apparatus 802 may be implemented using a programmable logic array (PLA), or using a custom integrated circuit chip.

In another embodiment, the present invention is implemented using a computer and software, wherein the software when executed in the computer enables the computer to operate in accordance with the present invention as discussed herein. The software is implemented to embody the operational features of the invention as discussed herein, such as (but not limited to) those operational features encompassed in the flowchart of FIG. 2. Based on the disclosure of the invention contained herein, the structure and operation of the software would be apparent to persons skilled in the relevant art.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An apparatus for interactively magnifying a first texture to generate a high resolution display image, pixels of said high resolution display image having varying levels of detail, said apparatus adapted for use with an interactive computer graphics processing system, the first texture and a second texture being stored in the interactive computer graphics processing system, the first texture being of higher resolution than the second texture, said apparatus comprising:

extrapolating means for using the first and second textures to generate an extrapolated frequency band approximating high frequency image information contained in a texture of higher resolution than said first texture;

scaling means for scaling said extrapolated frequency band on a per pixel basis as a function of each pixel's level of detail to generate a scaled extrapolated frequency band, said scaled extrapolated frequency band approximating high frequency image information contained in a magnified image of the first texture; and image augmenting means for augmenting the first texture using said scaled extrapolated frequency band to thereby generate a magnified image of the first texture.

2. The apparatus of claim 1, wherein said extrapolating means comprises:

first mapping means for mapping from a pixel of an image at said pixel's level of detail to the first texture to obtain a texel value from the first texture corresponding to said pixel;

second mapping means for mapping from said pixel to the second texture to obtain a texel value from the second texture corresponding to said pixel; and extrapolated frequency band generating means for generating said extrapolated frequency band as a function of said first texture texel value and said second texture texel value.

3. The apparatus of claim 2, wherein said extrapolated frequency band generating means comprises means for subtracting said second texture texel value from said first texture texel value to thereby generate said extrapolated frequency band.

4. The apparatus of claim 2, wherein said first mapping means comprises first interpolating means for interpolating among texel values of said first texture to obtain said first texture texel value, and wherein said second mapping means comprises second interpolating means for interpolating among texel values of said second texture to obtain said second texture texel value.

5. The apparatus of claim 4, wherein said first and second interpolating means respectively obtain said first and second texture texel values using a bilinear interpolation scheme.

6. The apparatus of claim 1 in which the first texture can be magnified to multiple levels of detail, wherein said scaling means comprises:

scale factor generating means for generating scale factors each associated with one of said levels of detail; and extrapolated frequency band modifying means for modifying each pixel of said extrapolated frequency band as a function of a scale factor associated with each pixel's level of detail to thereby generate said scaled extrapolated frequency band.

7. The apparatus of claim 6, wherein said extrapolated frequency band modifying means comprises a multiplier to multiply said extrapolated frequency band with said particular one of said scale factors to thereby generate said scaled extrapolated frequency band.

8. The apparatus of claim 1, wherein said image augmenting means comprises an adder for adding image information from the first texture to said scaled extrapolated frequency band to thereby generate at least a portion of said magnified image of the first texture.

9. The apparatus of claim 1, wherein the first texture includes high frequency information primarily comprising highly correlated edge information, such that said high frequency information at corresponding image positions is generally identical for all levels of detail.

10. A method for interactively magnifying a first texture to generate a high resolution display image, pixels of said high resolution display image having varying levels of detail, said method adapted for use with an interactive computer graphics processing system, the first texture and a second texture being stored in the interactive computer graphics processing system, the first texture being of higher resolution than the second texture, said method comprising the steps of:

(a) using the first and second textures to generate an extrapolated frequency band approximating high frequency image information contained in a texture of higher resolution than said first texture;

(b) scaling said extrapolated frequency band on a per pixel basis as a function of each pixel's level of detail to generate a scaled extrapolated frequency band, said scaled extrapolated frequency band approximating high frequency image information contained in a magnified image of the first texture; and (c) augmenting the first texture using said scaled extrapolated frequency band to thereby generate a magnified image of the first texture.

11. The method of claim 10, wherein step (a) comprises the steps of:

(i) mapping from a pixel of an image at said pixel's level of detail to the first texture to obtain a texel value from the first texture corresponding to said pixel;

(ii) mapping from said pixel to the second texture to obtain a texel value from the second texture corresponding to said pixel; and (iii) generating said extrapolated frequency band as a function of said first texture texel value and said second texture texel value.

12. The method of claim 11, wherein step (iii) comprises the step of subtracting said second texture texel value from said first texture texel value to thereby generate said extrapolated frequency band.

13. The method of claim 11, wherein step (i) comprises the step of interpolating among texel values of said first texture to obtain said first texture texel value, and wherein step (ii) comprises the step of interpolating among texel values of said second texture to obtain said second texture texel value.

14. The method of claim 13, wherein said interpolating steps each comprises using a bilinear interpolation scheme to respectively obtain said first and second texture texel values.

15. The method of claim 10 in which the first texture can be magnified to multiple levels of detail, wherein step (b) comprises the steps of:

(i) generating scale factors each associated with one of said levels of detail; and (ii) modifying each pixel of said extrapolated frequency band as a function of a scale factor associated with each pixel's level of detail to thereby generate said scaled extrapolated frequency band.

16. The method of claim 15, wherein step (ii) comprises the step of multiplying said extrapolated frequency band with said particular one of said scale factors to thereby generate said scaled extrapolated frequency band.

17. The method of claim 10, wherein step (c) comprises the step of adding image information from the first texture to said scaled extrapolated frequency band to thereby generate at least a portion of said magnified image of the first texture.

18. The method of claim 10, wherein the first texture includes high frequency information primarily comprising highly correlated edge information, such that said high frequency information at corresponding image positions is generally identical for all levels of detail.

19. An apparatus for interactively magnifying a first texture to generate a magnified image of the first texture, pixels of said magnified image having varying levels of detail, said apparatus comprising:
- scale factor generating means for generating scale factors for said varying levels of detail, said scale factors each having a value not greater than zero;
- a subtracter for subtracting image information from the first texture from image information from a second texture to thereby generate an extrapolated frequency band approximating high frequency image information contained in a texture of higher resolution than said first texture;
- a multiplier for multiplying a value of each pixel of said extrapolated frequency band with a scale factor associated with said each pixel's level of detail to thereby generate a scaled extrapolated frequency band; and
- an adder for adding image information from said first texture to said extrapolated frequency band to thereby generate at least a portion of the magnified image of the first texture.

20. A method of interactively magnifying a first texture to generate a magnified image of the first texture, pixels of said magnified image having varying levels of detail, said method comprising the steps of:
- generating scale factors for said varying levels of detail, said scale factors each having a value not greater than zero;
- subtracting image information from the first texture from image information from a second texture to thereby generate an extrapolated frequency band approximating high frequency image information contained in a texture of higher resolution than said first texture;
- multiplying a value of each pixel of said extrapolated frequency band with a scale factor associated with said each pixel's level of detail to thereby generate a scaled extrapolated frequency band; and
- adding image information from said first texture to said extrapolated frequency band to thereby generate at least a portion of the magnified image of the first texture.

* * * * *